US008370381B2

(12) United States Patent
Burger et al.

(10) Patent No.: US 8,370,381 B2
(45) Date of Patent: Feb. 5, 2013

(54) LOCATION BASED INFORMATION

(75) Inventors: Michel C. Burger, Woodinville, WA (US); Balabaskaran Balakumaran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 355 days.

(21) Appl. No.: 11/525,510

(22) Filed: Sep. 22, 2006

(65) Prior Publication Data

US 2008/0077615 A1    Mar. 27, 2008

(51) Int. Cl.
    *G06F 17/30*    (2006.01)
(52) U.S. Cl. .................... 707/769; 707/780; 701/201
(58) Field of Classification Search .............. 707/104, 707/769
    See application file for complete search history.

(56) References Cited

U.S. PATENT DOCUMENTS

| | | | |
|---|---|---|---|
| 7,031,700 B1 * | 4/2006 | Weaver et al. ............. | 455/420 |
| 7,069,003 B2 | 6/2006 | Lehikoinen et al. ....... | 455/414.2 |
| 7,483,881 B2 * | 1/2009 | Egnor et al. ............... | 1/1 |
| 2002/0087525 A1 * | 7/2002 | Abbott et al. .............. | 707/3 |
| 2002/0164995 A1 | 11/2002 | Brown et al. .............. | 455/456.1 |
| 2003/0008661 A1 * | 1/2003 | Joyce et al. ................ | 455/456 |
| 2003/0061211 A1 * | 3/2003 | Shultz et al. ............... | 707/3 |
| 2005/0064852 A1 | 3/2005 | Baldursson ................ | 455/414.2 |
| 2005/0245271 A1 * | 11/2005 | Vesuna ....................... | 455/456.1 |
| 2005/0272413 A1 | 12/2005 | Bourne ....................... | 455/415 |
| 2005/0278371 A1 | 12/2005 | Funk et al. ................. | 707/102 |
| 2006/0019699 A1 | 1/2006 | Chang et al. .............. | 455/552.1 |
| 2006/0029296 A1 | 2/2006 | King et al. ................. | 382/313 |
| 2006/0115108 A1 | 6/2006 | Rodriguez ................. | 382/100 |
| 2007/0135993 A1 * | 6/2007 | Riise et al. ................. | 701/207 |
| 2007/0282526 A1 * | 12/2007 | Smith ......................... | 701/211 |
| 2008/0141117 A1 * | 6/2008 | King et al. ................. | 715/238 |

OTHER PUBLICATIONS

Xiaoyan Chen et al., "An Efficient Spatial Publish/Subscribe System for Intelligent Location Based Services", 2003, 6 pgs., http://delivery.acm.org/10.1145/970000/966625/4-chen.pdf?key1=96625&key2=5034115511&coll=portal&dl=ACM&CFID=15151515&CFTOKEN=6184618.

Keith Cheverst et al., "The role of adaptive hypermedia in a context-aware tourist GUIDE", Communications of the ACM, May 2002, vol. 45, No. 5, pp. 47-51, ACM Press, NY, USA, http://delivery.acm.org/10.1145/510000/506244/p47-cheverst.pdf?key  1=506244&key2=3157125511&coll=GUIDE&dl=GUIDE&CFID=3256630&CFTOKEN=88690959.

Matthew William David Mankins, "Location Linked Information", Sep. 2003, pp. 1-99, http://alumni.media.mit.edu/~mankins/lli/lli-thesis.pdf.

Sheng-Cheng Yeh et al., "An Application Service of the Mobile Audio Blog for Location-aware Systems Based on Wireless Campus Networks", Taoyuan, Taiwan, Ming Chuan University, pp. 1-14;, http://imedia.cce.mcu.edu.tw/interactive/resserver.php?blogId=17&resource=SUTC2006_fin.pdf.

* cited by examiner

*Primary Examiner* — Etienne Leroux
*Assistant Examiner* — Sabana Rahman
(74) *Attorney, Agent, or Firm* — Merchant & Gould

(57) ABSTRACT

Location based information may be provided. Data may be received having an entry predicate. The data may comprise, for example, a weblog (blog). The entry predicate may comprise location information defining an applicable zone for the data. Location information may be provided in the received entry predicate when it is determined that the location information is missing from the received entry predicate. Next, the data and the entry predicate may be saved. Then an application zone may be calculated, for the saved data, based on the entry predicate. Next, a request may be received comprising a reader predicate. In response to receiving the request, the data may be transmitted when the reader predicate corresponds to the application zone. The data may be transmitted to a request device from which the request was received. The request device may comprise a mobile device.

20 Claims, 3 Drawing Sheets

LOCATION BASED INFORMATION

BACKGROUND

A weblog, which is usually shortened to blog, is a type of website where entries are made (e.g. a journal or diary) and displayed in a reverse chronological order. Blogs often provide commentary or news and information on a particular subject (or "channel"), such as food, politics, or local news. Some blogs function as more personal online diaries. A typical blog combines text; images, and links to other blogs, web pages, and other media related to its topic. Most blogs are primarily textual although some focus on photographs (photoblog), videos (vlog), or audio (podcasting). In some situations, it may be useful to have location information associated with a blog entry. This often causes problems because the conventional strategy does not attach location information to a blog entry based, for example, on multiple sources by invoking on the fly a location service.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Location based information may be provided. Data may be received having an entry predicate. The data may comprise, for example, a weblog (blog). The entry predicate may comprise location information defining an applicable zone for the data. Location information may be provided in the received entry predicate when it is determined that the location information is missing from the received entry predicate. Next, the data and the entry predicate may be saved. Then an application zone may be calculated, for the saved data, based on the entry predicate. Next, a request may be received comprising a reader predicate. In response to receiving the request, the data may be transmitted when the reader predicate corresponds to the application zone. The data may be transmitted to a request device from which the request was received. The request device may comprise a mobile device.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
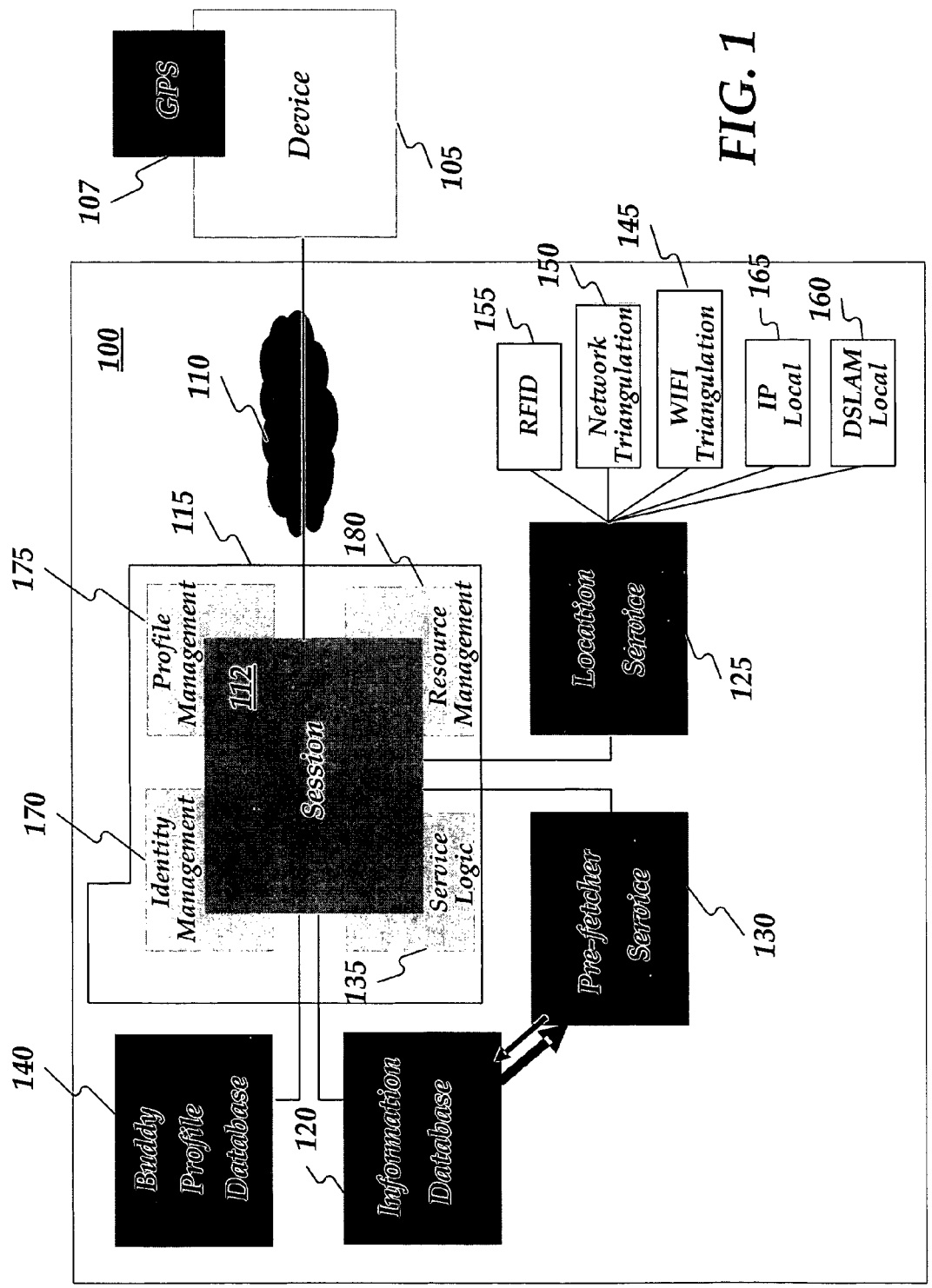
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Location based information may be provided. Consistent with embodiments of the invention, the information may comprise, but is not limited to, a blog entry. The blog entry may comprise, but is not limited to, commentary or news and information on a particular subject (e.g. channel), such as, but not limited to, food, politics, or local news. The blog entry may ultimately be directed toward a blog reader (e.g. request device). For example, consistent with embodiments of the invention, a user may be subscribed to a real estate channel that has left contextualized blogs of the price and characteristics of a house tied to the house's location. By having subscribed to the real estate channel, the user can now receive the blogs at the time the user is physically near (e.g. in front on the house while roaming in the street, for example. In another example, a bus channel blog service can be created to leave the user with a current bus schedule when the user is waiting at a bus stop. Consistent with embodiments of the invention, information may only appear on the user's mobile telephone (e.g. request device) when the user is physically at the bus stop. In yet another example, consistent with embodiments of the invention, localized news can be left and may "pop up" on the user's mobile telephone when the user's mobile telephone is at a location (e.g. zip code) associated with the localized news.

FIG. 1 is a block diagram of an operating environment. Consistent with embodiments of the invention, FIG. 1 shows a location based information system 100 and a device 105. Device 105 may comprise an input device from which information (e.g. a blog) is received by system 100 over, for example, a network 110. Furthermore, device 105 may comprise a request device from which a request is received by system 100 or to which system 100 may transmit the data. While FIG. 1 shows device 105 comprising both the input device and the request device, the input device and the request device may comprise separate devices connected to system 100. Device 105 may comprise, but is not limited to, a computer, a mobile telephone, a cellular telephone, a wireless telephone, a wireless device, a hand-held personal computer, a hand-held computing device, a multiprocessor system, microprocessor-based or programmable consumer electronic device, a personal digital assistant (PDA), a telephone, a pager, or any other device for receiving, processing, and transmitting information. Device 105 may also include a global positioning system (GPS) client 107 as will be described in more detail below.

As shown in FIG. 1, system 100 may include a context service 115 (e.g. implemented using connected services framework (CSF)), an information database 120, a location service 125, and a contextualized pre-fetcher service 130. Context service 115 may include a service logic 135 configured to allow system 100 perform needed actions. As described in more detail below, system 100 may also be connected to a persona that may represent a user or device 105 uploading the information to system 100. Also as described in more detail below, location service 125 may use a wireless fidelity (WiFi) triangulation database 145, a network triangulation database 150, a radio frequency identification (RFID) tag database 155, a digital subscriber line access multiplexer (DSLAM) database 160, and an internet protocol address (IP) address database 165. Context server 115 may further include an identity management module 170, a profile management module 175, and a resource management module 180. Modules 135, 170, 175, and 180 may be used by context server 115 to provide session management and security between system 100 and device 105.

Consistent with embodiments of the invention, information, (e.g. a blog entry) configured, for example, to provide commentary, news, or information on a particular subject (or channel established by a buddy profile database 140), may be directed toward a blog reader (e.g. request device). System 100, as described below, may establish a location based "predicate" on the blog entry and save the predicated blog entry. In addition, system 100 may retrieve the blog entry based on a calculation evolving the blog entry's location predicate and a predicate of the blog reader. Embodiments of the invention may rely on device based location information generated by a device (e.g. device 105) used to create the blog in order to attach a location to a piece of information entered into the log.

Network 110 may comprise, for example, a local area network (LAN) or a wide area network (WAN). Such networking environments may be used, for example, in offices, enterprise-wide computer networks, intranets, and the Internet. When a LAN is used as network 110, a network interface located at any of system 100 and device 105 may be used to interconnect any of system 100 and device 105. When network 110 is implemented in a WAN networking environment, such as the Internet, system 100 and device 105 may include an internal or external modem (not shown) or other components for establishing communications over the WAN. Further, in utilizing network 110, data sent over network 110 may be encrypted to insure data security by using encryption/decryption techniques.

In addition to utilizing a wire line communications system as network 110, a wireless communications system, or a combination of wire line and wireless may be utilized as network 110 in order to, for example, exchange web pages via the Internet, exchange e-mails via the Internet, or for utilizing other communications channels. Wireless can be defined as radio transmission via the airwaves. However, various other communication techniques can be used to provide wireless transmission, including infrared line of sight, cellular, microwave, satellite, packet radio, and spread spectrum radio. Wireless data may include, but is not limited to, paging, text messaging, e-mail, Internet access and other specialized data applications specifically excluding or including voice transmission. For example, system 100 and device 105 may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, another RF communication interface, and/or an optical interface. The aforementioned interfaces are examples and others may be used.

Figure 2:
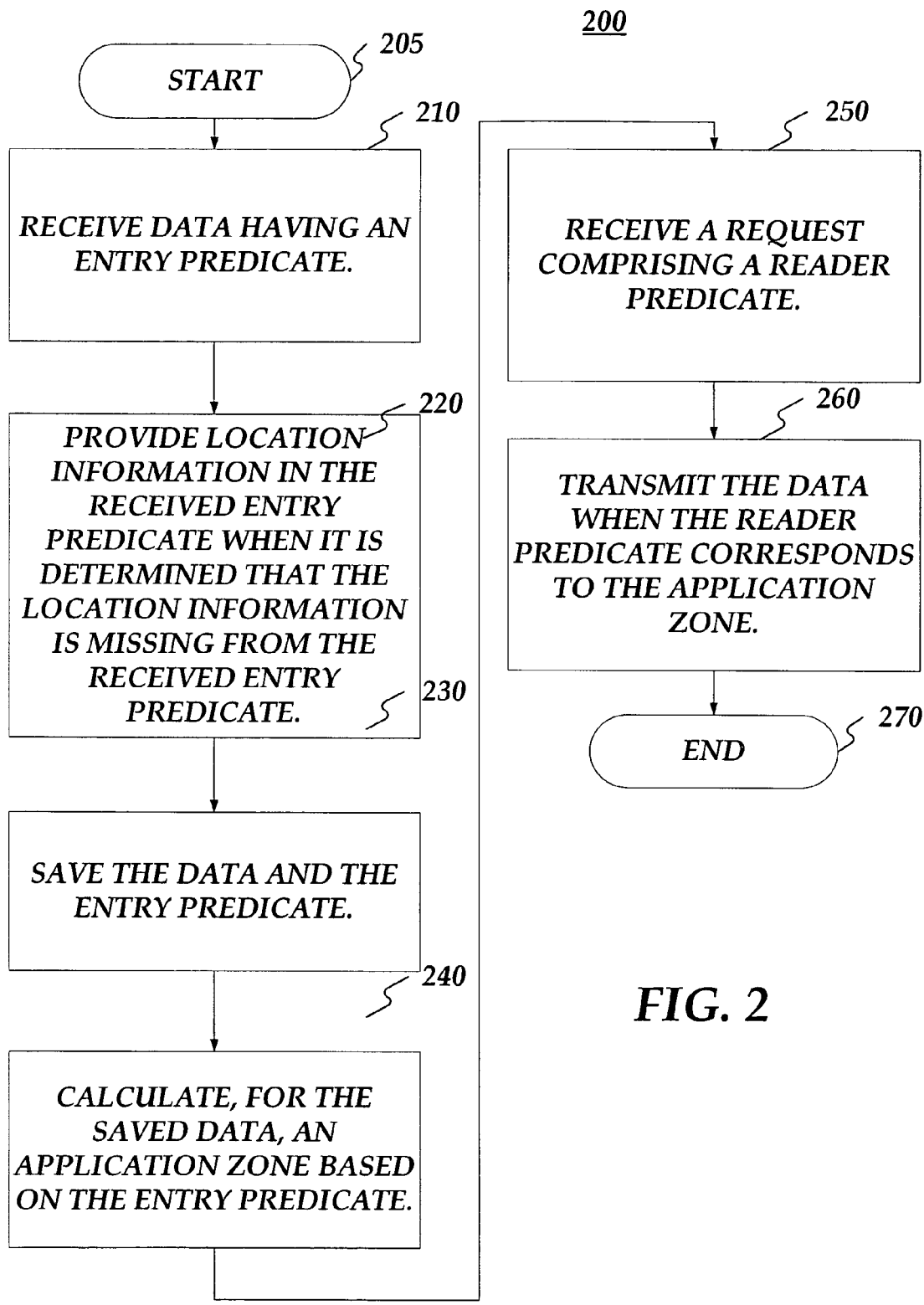
FIG. 2 is a flow chart of a method for providing location based information.

FIG. 2 is a flow chart setting forth the general stages involved in a method 200 consistent with an embodiment of the invention for providing location based information. Method 200 may be implemented using system 100 as described above. System 100 may be implemented using a computing device 300 as described in more detail below with respect to FIG. 3. Ways to implement the stages of method 200 will be described as follows. Method 200 may begin at starting block 205 and proceed to stage 210 where system 100 may receive data having an entry predicate. Device 105 may provide the data having the entry predicate to system 100. For example, when the data (e.g. a blog) is generated using device 105, the data may be sent to a context session 112 running in context server 115. Device 105 may have received location information via a process (e.g. GPS client 107) running in device 105 or may be entered by a user. Moreover, device 105 may, as part of its own configuration, provide the entry predicate associated with the data. The entry predicate may define a time or geographic zone (e.g. application zone) for which the data is valid. The entry predicate may comprise a diameter based zone of validity, for example, a radius of a certain distance around coordinates, a building that contains the coordinates, legal regions (e.g. city, county, state, country, act). that contain the coordinates.

From stage 210, where system 100 may receive the data having the entry predicate, method 200 may advance to stage 220 where system 100 may provide location information in the received entry predicate when it is determined that the location information is missing from the received entry predicate. For example, when the data arrives in context service 115, a check for location information and predicate may be made. If the location information is missing, context service 115 may make a request to location service 125 for location information. The requested location information can be more precise (e.g. exact coordinates) or more vague (e.g. cell, wifi triangulation/zone, RFID triangulation/zone, DSLAM location, IP location, WIFI, act). Based on the location information received from location service 125 and based on the predicate attached to the data, a location may be calculated and a new updated predicate may be entered to provide better location information.

Consistent with embodiments of the invention, a "persona" may be present whose location may be perceivable by system 100 and in particularly, location service 125. In this way, location information regarding the persona may be a surrogate for the location information for device 105. If the persona associated with device 105 is present and perceivable by system 100, the persona itself may be interrogated. For example, the user, at the time the data is entered on device 105, may have another device that could provide the location information. For example, the user may enter the data on device 105 comprising the user's personal computer (PC) and also have a telephone active and perceivable by location service 125. The PC may not provide any location information to location service 125, but because the persona (e.g. the user's active telephone) may have the last position associated with the user, the persona may provide to location service 125 this location information to be attached to the data submitted by the PC to context service 115.

Once system 100 provides the location information in the received entry predicate in stage 220, method 200 may continue to stage 230 where system 100 may save the data and the entry predicate. For example, context service 115 may send the data having the entry predicate to database 120 for storage. The data may have the original predicate or may have the predicate having location information updated by location service 125 as described above.

After system 100 saves the data and the entry predicate in stage 230, method 200 may proceed to stage 240 where system 100 may calculate, for the data saved data on database 120, an application zone based on the entry predicate associated with the data. For example, in preparation for receiving a request for the data from the request device, pre-fetcher service 130 may determined a zone for which the data should apply. In this way, when a request is received from the request device, the zone calculation would have already been done, thus saving time. For example, based on the entry predicate associated with the data, the application zone may be the city limits of Seattle, Wash. As a result, pre-fetcher service 130 may calculate all coordinates (or ranges of coordinates) that apply to the data. In this way, should system 100 receive from the request device a reader predicate corresponding the aforementioned calculated coordinates, system 100 may send the request device the data if the request device is subscribed to the channel corresponding to the data.

Once system 100 calculates the application zone based on the entry predicate in stage 240, method 200 may continue to stage 250 where system 100 may receive a request comprising a reader predicate. The request device may periodically, or by user initiation, provide system 100 with the reader predicate. For example, the request device may periodically send system 100 request device's GPS coordinates. Should system 100 receive from the request device coordinates corresponding to the aforementioned calculated application zone associated with the data, system 100 may send the request device the data if the request device is subscribed to the channel corresponding to the data. The request device may provide system 100 its coordinates or persona corresponding to the request device my provide system 100 with the reader predicate (e.g. coordinates). For example, the user operating the request device may be subscribed to a real estate channel that has previously left data regarding the price and characteristic of a house in database 120. The entry predicate associated with the data regarding the price and characteristic of the house may comprise GPS coordinates of the house and define a 500 foot radius around the home. Pre-fetcher service 130 may have calculated all GPS coordinates in the aforementioned 500 foot radius. The request device may periodically send its GPS coordinates to system 100. When system 100 determines that the request device's sent GPS coordinates fall within the aforementioned 500 foot radius around the home, and by the request device having been subscribed to the real estate channel, the user (e.g. the request device) can receive the data at the time the subject is physically near (e.g. within the 500 foot radius) the house while.

After system 100 receives the request comprising the reader predicate in stage 250, method 200 may proceed to stage 260 where system 100 may transmit the data when the reader predicate corresponds to the application zone. For example, as stated above, when system 100 determines that the request device's sent GPS coordinates fall within the aforementioned 500 foot radius around the home, and by the request device having been subscribed to the real estate channel, the user (e.g. the request device) can now receive the data at the time the subject is physically near the house. In other words, system 100 may transmit the data when the reader predicate corresponds to the application zone. Once system 100 transmits the data when the reader predicate corresponds to the application zone in stage 260, method 200 may then end at stage 270.

An embodiment consistent with the invention may comprise a system for providing location based information. The system may comprise a memory storage and a processing unit coupled to the memory storage. The processing unit may be operative to receive data having an entry predicate and to save the data and the entry predicate. Furthermore, the processing unit may be operative to calculate, for the saved data, an application zone based on the entry predicate. In addition, the processing unit may be operative to receive a request comprising a reader predicate and to transmit the data when the reader predicate corresponds to the application zone.

Another embodiment consistent with the invention may comprise a system providing location based information. The system may comprise a memory storage and a processing unit coupled to the memory storage. The processing unit may be operative to receive data having an entry predicate and to provide location information in the received entry predicate when it is determined that the location information is missing from the received entry predicate. The processing unit may be further operative to and save the data and the entry predicate.

Yet another embodiment consistent with the invention may comprise a system for providing location based information. The system may comprise a memory storage and a processing unit coupled to the memory storage. The processing unit may be operative to calculate an application zone based on an entry predicate associated with data. The entry predicate may have location information associated with a persona corresponding to an input device. In addition, the processing unit may be operative to receive a request comprising a reader predicate and to transmit the data when the reader predicate corresponds to the application zone.

Figure 3:
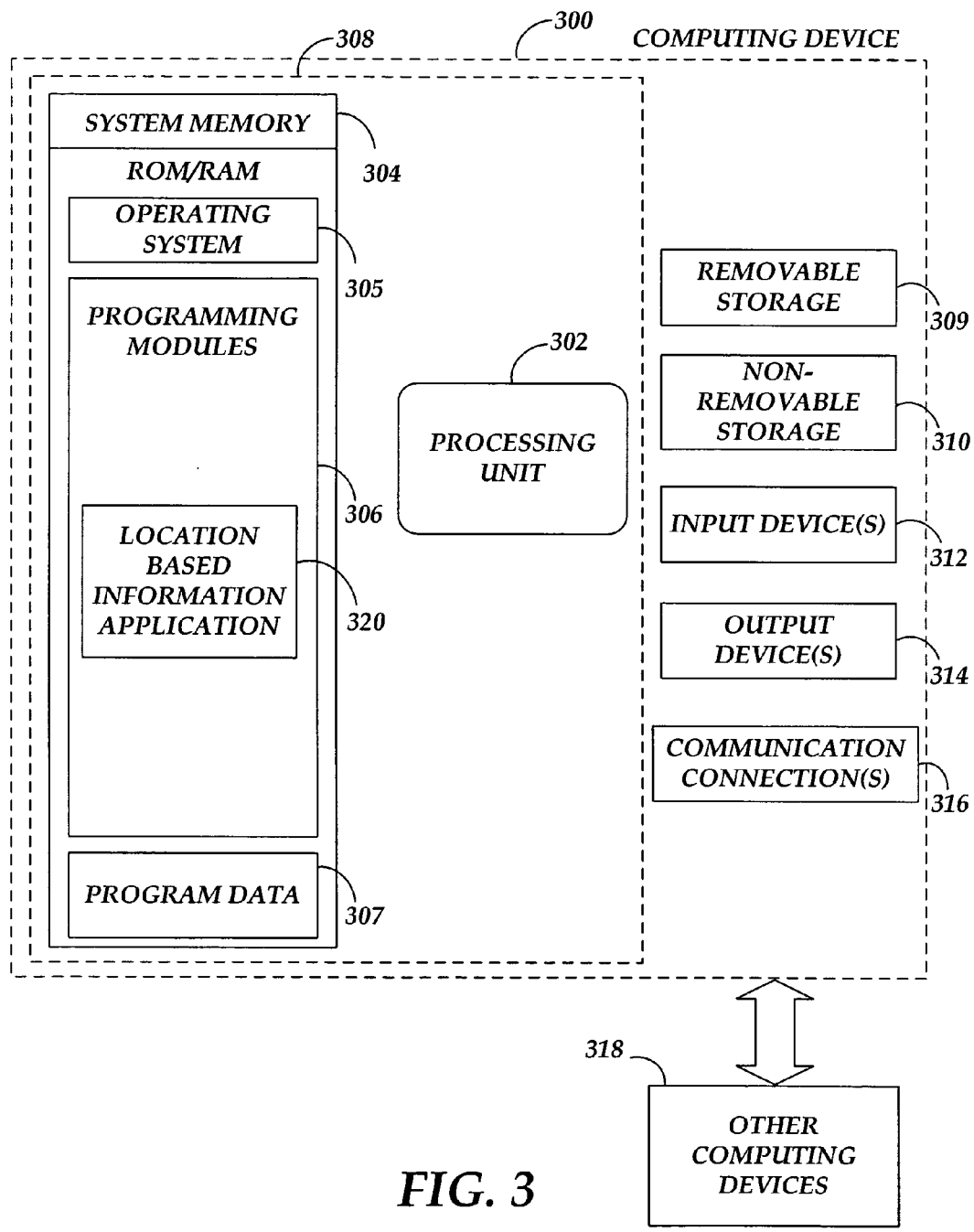
FIG. 3 is a block diagram of a system including a computing device.

FIG. 3 is a block diagram of a system including computing device 300. Consistent with embodiments of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may be used to implement the operating environment of system 100 as described above. For example, computing device 300 may be used to implement system 100 and may perform processes including, for example, one or more method 200's stages as described above. System 100 may operate in other environments and is not limited to computing device 300.

With reference to FIG. 3, system 100 consistent with embodiments of the invention may comprise a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a program data 307. Operating system 305, for example, may be suitable for controlling computing device 300's operation. In one embodiment, programming modules 306 may include, for example, a location based information application 320. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310.

Computer storage media may include volatile and nonvolatile, removable and non-removable media implemented in any process or technology for storage of information, such as computer readable instructions, data structures, program modules, or other data. System memory 304, removable storage 309, and non-removable storage 310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Any data stored as described above with respect to FIG. 2 may be stored, for example, in system memory 304, removable storage 309, or non-removable storage 310. For example, any of the databases described above may be stored in system memory 304, removable storage 309, or non-removable storage 310.

Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Other computing devices 318, may include, for example, device 105 as described above. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. location based information application 320) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing location based information, the method comprising:
    receiving, from a first device, the first device being a mobile device, data having an entry predicate, the entry predicate being associated with a zone of validity for defining an application zone associated with the entry predicate, wherein receiving the data having the entry predicate comprises determining location information of the first device based on a location of the first device;
    saving the received data, wherein saving the received data comprises:
        associating the received data with the application zone comprising geographical coordinates, the geographical coordinates being based on the location of the first device, and
        storing the received data for retrieval by a second device located within the application zone, the received data comprising content that is made accessible to the second device located within the application zone;
    receiving, from the second device comprising a processing unit coupled to a memory storage, a request comprising a reader predicate; and
    transmitting the data when the reader predicate corresponds to the application zone.

2. The method of claim 1, wherein receiving the data comprises receiving the data comprising a weblog (blog).

3. The method of claim 1, wherein receiving the data having the entry predicate comprises receiving the data having the entry predicate comprising the location information defining an applicable zone for the data.

4. The method of claim 3, wherein receiving the data having the entry predicate further comprises receiving the data having the entry predicate comprising the location information provided by a process running on the first device providing the data.

5. The method of claim 3, wherein receiving the data having the entry predicate comprises receiving the data having the entry predicate comprising the location information defining a location and an area relative to the location, the location and the area relative to the location defining, at least in part, the application zone.

6. The method of claim 1, wherein defining associating the received data with the application zone comprises calculating the application zone by a pre-fetcher service prior to receiving the request.

7. The method of claim 1, wherein transmitting the data comprises transmitting the data to the second device from which the request was received.

8. The method of claim 7, wherein transmitting the data to the second device from which the request was received comprises transmitting the data to a mobile device.

9. The method of claim 1, further comprising providing the location information in the received entry predicate when it is determined that the location information is missing from the received entry predicate.

10. The method of claim 9, wherein providing the location information in the received entry predicate comprises providing the location information using at least one of the following: global positioning system (GPS) coordinates of a persona associated with the first device providing the data, a wireless fidelity (WiFi) triangulation/zone of the persona associated with the first device providing the data, a location of cellular telephone equipment serving the persona associated with the first device providing the data, radio frequency identification (RFID) tag triangulation/zone of the persona associated with the first device providing the data, a location of a digital subscriber line access multiplexer (DSLAM) serving the persona associated with the request device providing the data, and an internet protocol address (IP) address of the persona associated with the first device providing the data.

11. A system for providing location based information, the system comprising:
    a memory storage; and
    a processing unit coupled to the memory storage, wherein the processing unit is operative to:
        receive data having an entry predicate, the entry predicate comprising location information from at least one of the following: a user providing the data and an input device providing the data,
        associate the data with a zone of validity used to define an application zone and at least one channel operative to provide at least one information service associated with the application zone, the application zone being determined, at least in part, by the location information provided in the entry predicate, the data comprising content that is made available to devices within the zone of validity, and
        save the data for subsequent retrieval by a request device located within the application zone.

12. The system of claim 11, wherein the processing unit being operative to receive the data comprises the processing unit being operative to receive the data comprising a weblog (blog).

13. The system of claim 11, wherein the processing unit being operative to receive the data having the entry predicate comprises the processing unit being operative to receive the data having the entry predicate comprising the location information defining the applicable zone for the data.

14. The system of claim 13, wherein the location information is provided by a process running on the input device providing the data.

15. The system of claim 13, wherein the location information further defines a location and an area relative to the location, the location and the area relative to the location defining, at least in part, the application zone.

16. The system of claim 11, wherein the processing unit is further operative to provide the location information in the received entry predicate when it is determined that the location information is missing from the received entry predicate, wherein the processing unit being operative to provide the location information comprises the processing unit being operative to provide the location information using at least one of the following: global positioning system (GPS) coordinates of the input device providing the data, a wireless fidelity (WiFi) triangulation of the input device providing the data, a location of cellular telephone equipment serving the input device providing the data, radio frequency identification (RFID) tag triangulation of the input device providing the data, a location of a digital subscriber line access multiplexer (DSLAM) serving the input device providing the data, and an internet protocol address (IP) address of the input device providing the data.

17. A computer-readable storage device which stores a set of instructions which when executed performs a method for providing location based information, the method executed by the set of instructions comprising:

calculating an application zone based on an entry predicate associated with data received from a first device, the entry predicate comprising location information retrieved from at least one of the following: a user providing the entry predicate and the first device providing the entry predicate, the location information of the entry predicate being used, at least in part, to define a zone of validity for retrieving the data received from the first device;

saving the received data, wherein saving the received data comprises:

associating the data with the application zone, and storing the data for retrieval by a second device located within the application zone, the data comprising content that is made accessible to a second device located within the application zone;

receiving a request, from the second device, for the data, the request comprising a reader predicate comprising a location of the second device; and transmitting the data when the location of the second device corresponds to the location information associated with the application zone.

18. The computer-readable storage device of claim 17, wherein calculating the application zone based on the entry predicate associated with the data comprises calculating the application zone based on the entry predicate by a pre-fetcher service prior to receiving the request.

19. The computer-readable storage device of claim 17, wherein transmitting the data comprises transmitting the data to the second device from which the request was received.

20. The computer-readable storage device of claim 17, wherein transmitting the data comprises transmitting the data to the second device from which the request was received, wherein the second device comprises a mobile device.

\* \* \* \* \*